(12) United States Patent
Abu Qahouq

(10) Patent No.: US 8,742,744 B2
(45) Date of Patent: Jun. 3, 2014

(54) SENSOR-LESS OPERATION AND DETECTION OF CCM AND DCM OPERATION MODES IN SYNCHRONOUS SWITCHING POWER CONVERTERS

(75) Inventor: Jaber A. Abu Qahouq, Tuscaloosa, AL (US)

(73) Assignee: University of Alabama, Tuscaloosa, AL (US)

( * ) Notice: Subject to any disclaimer, the term of this patent is extended or adjusted under 35 U.S.C. 154(b) by 84 days.

(21) Appl. No.: 13/144,457

(22) PCT Filed: Jan. 13, 2010

(86) PCT No.: PCT/US2010/020883
§ 371 (c)(1),
(2), (4) Date: Jul. 13, 2011

(87) PCT Pub. No.: WO2010/083202
PCT Pub. Date: Jul. 22, 2010

(65) Prior Publication Data
US 2011/0273157 A1    Nov. 10, 2011

Related U.S. Application Data

(60) Provisional application No. 61/144,287, filed on Jan. 13, 2009.

(51) Int. Cl.
*H02M 3/156* (2006.01)
(52) U.S. Cl.
USPC .......................................... 323/285; 323/351
(58) Field of Classification Search
USPC ........................... 323/282, 283, 284, 285, 351
See application file for complete search history.

(56) References Cited

U.S. PATENT DOCUMENTS

| 7,245,113 | B2 * | 7/2007 | Chen et al. | 323/271 |
|---|---|---|---|---|
| 7,248,027 | B2 * | 7/2007 | Ribeiro et al. | 323/282 |
| 7,353,122 | B2 * | 4/2008 | Kernahan et al. | 702/64 |
| 7,622,904 | B2 * | 11/2009 | Sutardja et al. | 323/282 |
| 7,652,459 | B2 * | 1/2010 | Abu Qahouq et al. | 323/283 |
| 8,179,110 | B2 * | 5/2012 | Melanson | 323/282 |

(Continued)

OTHER PUBLICATIONS

Abu Qahouq et al., "Adaptive Controller with Mode Tracking and Parametric Estimation", Mar. 1, 2007, Applied Power Electronics Conference, APEC 2007—Twenty Second Annual IEEE, pp. 1568-1574.*

(Continued)

*Primary Examiner* — Gary L Laxton
*Assistant Examiner* — Kyle J Moody
(74) *Attorney, Agent, or Firm* — Meunier Carlin & Curfman, LLC

(57) ABSTRACT

Generally, described herein are embodiments of control schemes for sensor-less operation and detection of CCM and DCM in a switching power converter. In one aspect, embodiments of a controller are described that utilize dual control loops and do not require sensing the inductor current or any current in the converter which eliminates or reduces the challenges and problems associated with current sensing. Advantages of embodiments of methods described herein become more significant when used in ultra high switching frequency converters since embodiments of the controller result in eliminating the need for high-speed low-noise current sensing circuitries, when used in on-chip integrated power converters where sensing accuracy may be a more significant issue compared to on-board power converters, and in power converters with paralleled modules since embodiments of the controller eliminate sensing circuitries in each of the modules.

12 Claims, 5 Drawing Sheets

Buck switching Power Converter

SLCD Basic Control Algorithm

(56) References Cited

U.S. PATENT DOCUMENTS

| | | |
|---|---|---|
| 2002/0167354 A1* | 11/2002 | Stanley .......................... 330/10 |
| 2006/0145678 A1* | 7/2006 | Ribeiro et al. ................ 323/299 |
| 2008/0129260 A1* | 6/2008 | Abu Qahouq et al. ........ 323/272 |
| 2008/0137379 A1* | 6/2008 | Mao ............................... 363/17 |
| 2008/0205087 A1* | 8/2008 | Asuncion et al. .............. 363/15 |
| 2009/0323375 A1* | 12/2009 | Galvano et al. ............ 363/21.06 |

OTHER PUBLICATIONS

Abu Qahouq et al., "Sensorless Current Sharing Analysis and Scheme for Multiphase Converters", May 21, 2007, Power Electronics Specialist Conference—PESC 2007, pp. 2029-2036.*

* cited by examiner

Buck switching Power Converter

Switching Waveforms in CCM Operation

Switching Waveforms in DCM Operation

SLCD control scheme concept block diagram

SLCD behavior plot to control $D_1$

Inductor current behavior for different $D_1$ conditions

SLCD Basic Control Algorithm

SENSOR-LESS OPERATION AND DETECTION OF CCM AND DCM OPERATION MODES IN SYNCHRONOUS SWITCHING POWER CONVERTERS

CROSS-REFERENCE TO RELATED APPLICATIONS

This application is a National State Entry of PCTUS10/20883 filed Jan. 13, 2010 which claims priority from Provisional Application No. 61/144,287 filed Jan. 13, 2009, both of which are incorporated herein by reference in their entirety.

FIELD

Embodiments of the invention relate, generally, to systems and methods for the control of power converters.

BACKGROUND

Switching power converters with synchronous rectification utilize switching between inductor's current continuous and discontinuous conduction operation modes (CCM and DCM) in order to achieve improved power efficiency across wide load and input voltage ranges. The inductor current zero crossing is sensed in order to detect the operation modes transition point between CCM and DCM. The challenges associated with this include inductor current zero crossing point sensing accuracy, noise effect near the zero crossing point and the sensing circuitry speed and power loss. Moreover, additional hardware such as ADC is required if the used controller is a fully digital controller.

While synchronous rectification is used in switching power converters in order to improve the power efficiency at high load currents in addition to reducing the output voltage ripple, transitioning from CCM to DCM at lighter load currents is used in order to improve light load power efficiency (as explained in references [1-4] listed on page 12). DCM emulation, as known in the art, is a technique used to improve power converter efficiency at lighter load currents while achieving higher efficiency at higher load currents by employing Synchronous Rectifiers (SRs) that operate at CCM. Usually, the DCM operation at lighter load currents is combined with variable or/and reduced switching frequency operation for larger efficiency improvement. Light load efficiency is desirable because new and future power managed load technologies operates most of the time (up to 90% of the time) at light load requirements. Achieving high efficiency across wide load ranges is desirable because the new and future generation of devices is highly power managed and they operate across wide load range and operate most of the time at lighter load currents. Therefore, SR CCM and DCM operations are important for lower power consumption.

Switching from CCM to DCM or vice versa requires sensing the zero crossing of the inductor current. This requires sensing the instantaneous inductor current information at the switching frequency speed, its accuracy and stability is sensitive to noise effect at the zero crossing transition point and it results in additional power losses by the sensing circuitries especially at higher load currents and at higher switching frequencies. The detection of the inductor current zero crossing, which determines the operation mode (CCM or DCM) and determines the SR switch turn off time in DCM, requires sensing the instantaneous current of the output inductor, where the high bandwidth sensing and detection circuitries are essential in order to detect the correct zero crossing point. Moreover, the switching noise, which is introduced at the instances of turning ON and OFF of the converter switches (where the zero crossing of inductor current occurs), makes it more difficult to detect the zero crossing time (and the non zero crossing) accurately. Furthermore, the sensing and detection circuitries power losses and sensing accuracy will impact the controller operation accuracy and impact the power conversion efficiency.

A converter with, for example, a 100 kHz+ or 100 MHz+ switching frequency requires very high-bandwidth low-noise sensing and comparator circuitry to detect the correct inductor current zero crossing for correct DCM and CCM operations. This implies high power loss through the sensing (which may include a sensor and an amplifier) and comparator circuitries. This power loss scales with the switching frequency, and therefore, the higher the switching frequency is (in the future), the higher the sensing power loss. This also impacts the cost and size of the controller. Moreover, the operation may be more impacted by the sensing accuracy at such frequencies as mentioned earlier. This is true in the case of using analog controller, digital controller, or mixed analog-digital controller. Moreover, if the implantation utilizes a fully digital controller, an additional ADC (Analog-to-Digital Converter) may be required which means additional size, cost, and power consumption (as explained in references [6, 7] listed on page 12).

Variable switching frequency is usually used during the DCM operation in order to gain further efficiency improvement (as explained in references [1-4] listed on page 12). Conventionally, the switching frequency is varied as a function of the load current or as a function of a variable that indicates the load current change such as the upper switch (control switch) duty cycle in a buck converter (or the voltage—mode closed-loop compensator error signal) (as explained in references [1-4] listed on page 12). Especially during the CCM operation, when the SR switch gate control signal is complementary to the control switch gate control signal, sufficient fixed or variable SR dead-time should be provided. Several SR dead-time control schemes are known in the art (as explained in references [5-7] listed on page 12). Adaptive SR dead-time control schemes are such those adjusting SR dead-time based on the input current minimization (as explained in reference [7] listed on page 12) or based on the duty cycle minimization (as explained in references [6] listed on page 12).

A need therefore exists for power converter control systems and methods that do not require sensing the inductor current or any current in the converter which eliminates or reduces challenges associated with inductor current sensing for the zero point detection.

BRIEF SUMMARY

Generally, described herein are embodiments of control schemes for sensor-less operation and detection of CCM and DCM in a switching power converter. In one aspect, embodiments of a controller are described that utilize dual control loops and do not require sensing the inductor current or any current in the converter which eliminates or reduces the challenges and problems associated with current sensing. Advantages of embodiments of methods described herein become more significant when used in ultra high switching frequency converters (as explained in references [8, 9] listed on page 12) since embodiments of the controller result in eliminating the need for high speed low-noise current sensing circuitries, when used in on-chip integrated power converters where sensing accuracy may be a more significant issue compared to on-board power converters, and in power converters With paralleled modules since embodiments of the controller eliminate sensing circuitries in each of the modules.

In one aspect, the inductor current zero crossing point can be interpreted from a pulse-width modulation (PWM) duty cycle value (which is an available parameter in a digital controller and need no additional sensing) during DCM operation. The operation and turn off time of the SR for higher efficiency can also be interpreted from the PWM duty cycle value in DCM mode. In other words, the value of the lower switch ON time (or duty cycle D1) is made as a function of the value of the upper switch ON time (or duty cycle D) which is determined by the output voltage regulation closed loop. Therefore, the DCM mode can be implemented with no need for inductor current sensing, resulting in lower controller power consumption, higher power conversion efficiency, lower sensitivity to noise, and lower size and cost (by reducing the number of components).

Additional advantages will be set forth in part in the description which follows or may be learned by practice. The advantages will be realized and attained by means of the elements and combinations particularly pointed out in the appended claims or inventive concepts. It is to be understood that both the foregoing general description and the following detailed description are exemplary and explanatory only and are not restrictive.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1A:
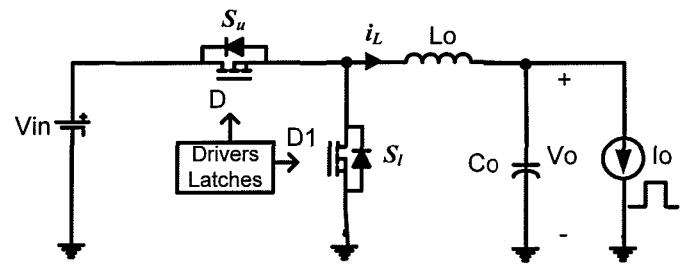
FIGS. 1a, 1b and 1c show a buck converter and its operation waveforms in CCM and DCM.
Figure 1:
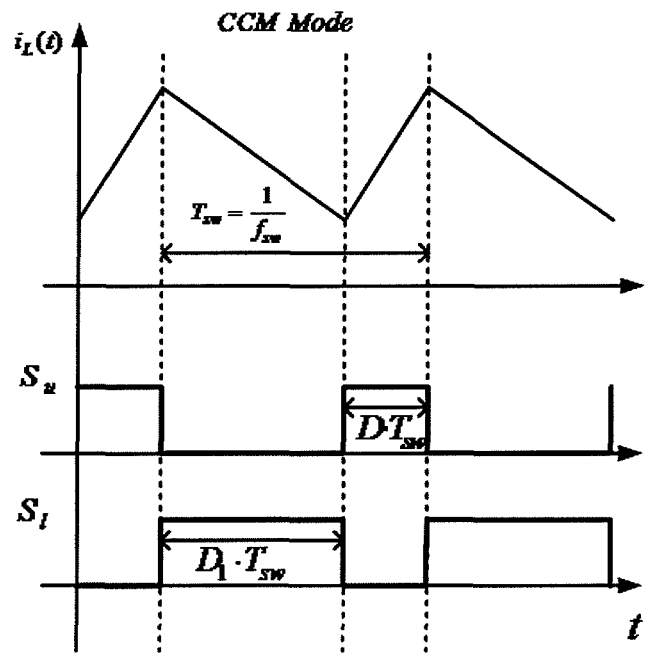

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims or inventive concepts, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims or inventive concepts of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As can be appreciated by one skilled in the art, embodiments can comprise a method, a data processing system, or a computer program product. Accordingly, the aspects described herein can take the form of an entirely hardware embodiment, an entirely software embodiment, or an embodiment combining software and hardware aspects. Furthermore, aspects described herein can take the form of a computer program product on a computer-readable storage medium having computer-readable program instructions (e.g., computer software) embodied in the storage medium. More particularly, aspects can take the form of web-implemented computer software. Any suitable computer-readable storage medium may be utilized including hard disks, CD-ROMs, optical storage devices, or magnetic storage devices.

Embodiments are described below with reference to block diagrams and flowchart illustrations of methods, apparatuses (i.e., systems) and computer program products. It is to be appreciated that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present methods and systems may be understood more readily by reference to the following detailed description and the Examples included therein and to the Figures and their previous and following description.

Figure 1C:
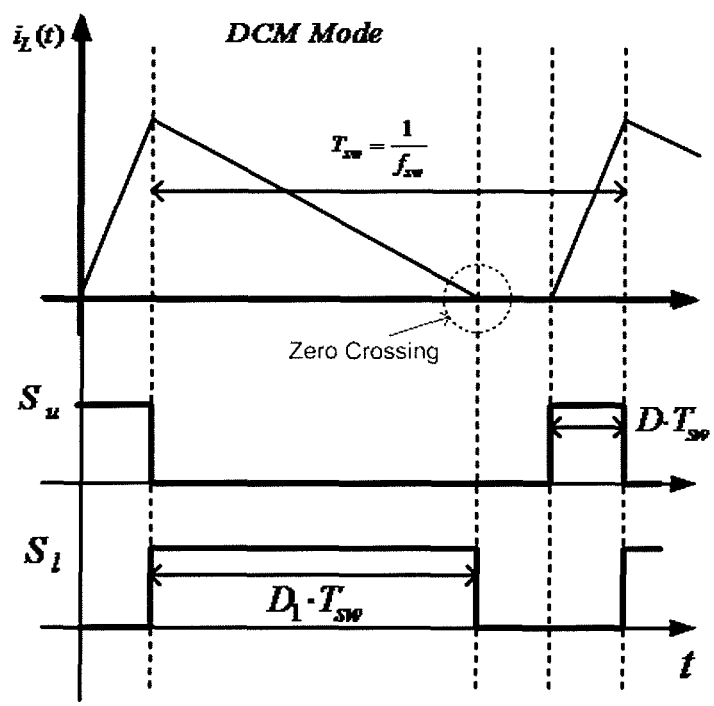
Figure 2:
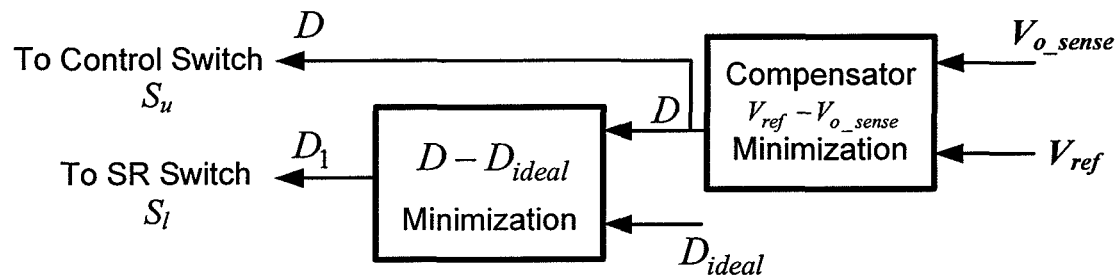
FIG. 2 is a schematic block diagram of an embodiment of an SLCD control scheme.

System Architecture:

Referring to FIGS. 1(a)-1(c), illustrations of an exemplary buck switching power convertor (FIG. 1(a)) and operation waveforms of the exemplary buck converter in CCM operation (FIG. 1(b)) and DCM operation (FIG. 1(c)) are shown. In this exemplary converter, there are two variables of concern to control—the control switch (upper-side FET) duty cycle (D) and the SR switch (lower-side FET) width ratio ($D_1$) Briefly, the upper side switch ($S_u$) in a buck converter can be turned on based on the PID (Proportional-Integral-Derivative) compensator and PWM (Pulse Width Modulation) controller (or any other type of closed loop or open loop controller) decision to regulate the output voltage ($V_o$), while the lower side switch (the SR switch) ($S_1$) can be turned on while the upper side switch is turned off until the inductor current ($i_L$) crosses the zero point (DCM operation mode), if it does, otherwise it stays turned on until the next switching cycle when the upper side switch is to be turned on again (CCM operation mode). Embodiments of a sensor-less CCM-DCM (SLCD) power controller as described herein can be summarized as follows (refer to FIGS. 1(a)-1(c) and FIG. 2): Referring to FIG. 2, which is an SLCD control scheme concept block diagram, there are two parameters controlled by the SLCD power controller, the output voltage and $D_1$. The output voltage is controlled and maintained regulated by minimizing the difference between the reference voltage ($V_{ref}$) and the sensed voltage ($V_{o\_sense}$) through a conventional voltage-mode closed-compensator via the adjustment of D. The $D_1$ is controlled such that its falling edge ends (turn OFF time instant) either at the zero crossing (in DCM) of the inductor current or at the end of the switching cycle (CCM) by minimizing D, or in other words minimizing the difference between the actual duty cycle D and the ideal duty cycle $D_{ideal}$ (for a lossless converter).

Figure 3:
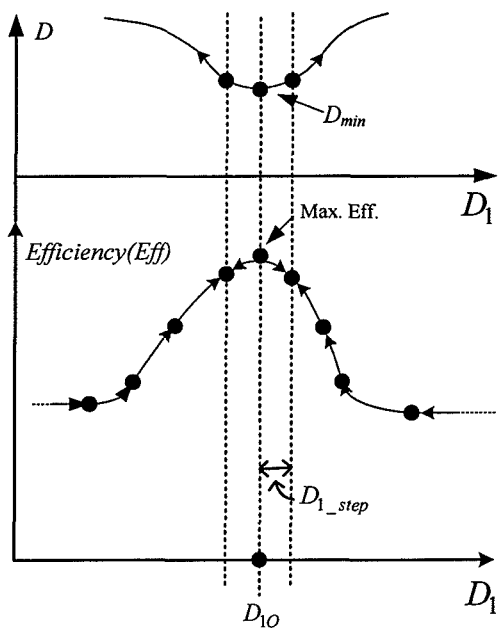
FIG. 3 is an embodiment of an SLCD behavior plot to control $D_1$.

Operation of an exemplary SLCD controller involves consideration that the optimum value of $D_1$ (shown in FIG. 3 as $D_{1O}$) or optimum turn OFF time of the SR FET (or switch in general) results in the highest efficiency. That is, if $D_1$ is lower or higher than its optimum value, the efficiency will be lower. This is because if the converter power loss is large, then a larger D value will be required, which leads to higher input power/current in a buck converter for the same output power, and therefore minimizing D indicates higher efficiency. By making $D_1$ a function of D minimization, the optimum $D_1$ can be detected for both CCM and DCM modes. In other words, the zero crossing time instant of the inductor current can be detected without sensing the inductor current. This behavior is demonstrated in FIG. 3, an SLCD behavior plot to control $D_1$, which shows that the point ($D_{1O}$) where D is minimized ($D_{min}$) results in the highest efficiency (Max. Eff.) of the exemplary SLCD.

Figure 4:
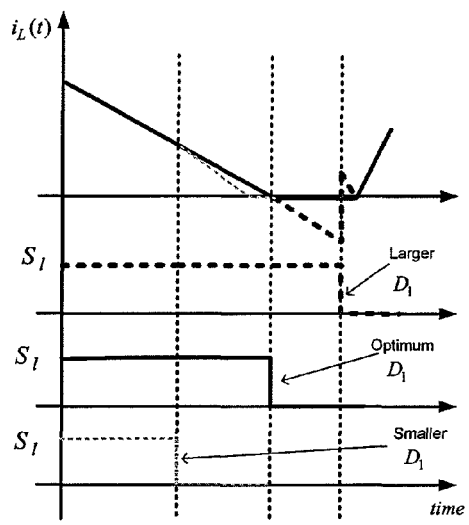
FIG. 4 is a plot showing examples of inductor current behavior for different $D_1$ conditions.

FIG. 4 shows inductor current behavior for different $D_1$ conditions. Generally, FIG. 4 shows inductor current ($i_L(t)$) possible waveforms if $D_1$ is larger or smaller than its optimum value. If $D_1$ is larger than it should be, the current comes back to zero after it becomes negative, which causes additional power conduction loss and power switching loss (since the switch is not turned OFF at zero current). If $D_1$ is smaller than it should be, the inductor current slope will change once the SR switch is turned OFF early, since the voltage drop across it will change, and this will also cause additional power losses. At optimum $D_1$, the SR switch is turned off at the zero crossing of the inductor current, thus minimizing power losses.

Figure 5:
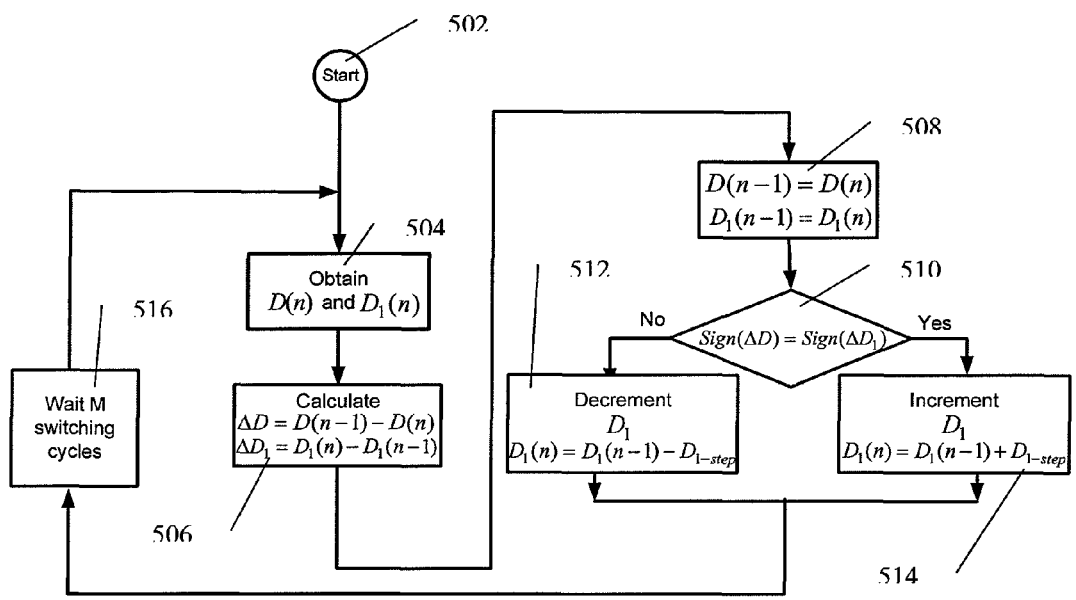
FIG. 5 shows an embodiment of an SLCD control algorithm.

Algorithms:

A. Basic Algorithm:

The duty cycle D minimization block of FIG. 2 that regulates the value of $D_1$ can be implemented using a variety of filter types and algorithms. FIG. 5 shows one embodiment of a basic control algorithm for implementation as a part of a digital power controller. As shown in FIG. 5, the algorithm increments and decrements $D_1$ based on the sign change of D and $D_1$ such that D moves toward its minimum possible value for a specific power stage. In this embodiment of an algorithm, it is not required to use $D_{ideal}$ as a reference, which would require the knowledge of the input voltage in addition to the output voltage in order to calculate $D_{ideal}=V_o/V_{in}$ for a buck converter power stage.

An optional few M switching cycles delay (for example, 4 switching cycles) are used to delay the next algorithm iteration in order to make sure than any disturbance caused by adjusting $D_1$ is settled. However, since D is not adjusted and $D_1$ is adjusted with small steps, the disturbance is usually small and can be ignored.

As shown in FIG. 5, the value n represents the iteration of the algorithm. For instance, in the first iteration the value of n will be 1, in the second iteration the value of n will be 2, etc. The algorithm begins at step 502. At step 504, values (for this iteration of the algorithm) are obtained for D and $D_1$. At step 506, the current iteration values for D and $D_1$ are compared to values of D and $D_1$ obtained during the previous iteration and a change ($\Delta$) is calculated for each of D and $D_1$. At step 508, the value for D(n−1) is set to the current iteration value of D and the value of $D_1$(n−1) is set to the current iteration value of $D_1$. At step 510, the sign (+/−) of $\Delta D$ is compared to that of $\Delta D_1$. If the signs are different, then at step 512 $D_1$ is decremented. If the signs are the same, then at step 514 $D_1$ is incremented. At (optional) step 516, the algorithm may delay M switching cycles before beginning the next iteration.

B. Modified Algorithm:

D and $D_1$ theoretical values in CCM and DCM based on an exemplary lossless buck converter assumption are given by:

CCM Mode:

$$D_{CCM} = V_o/V_{in} \qquad (1)$$

$$D_{1-CCM} = 1-(V_o/V_{in}) = 1-D_{CCM} \qquad (2)$$

DCM Mode:

$$D_{DCM} = \sqrt{\left[\frac{(2 \cdot L_o \cdot I_o \cdot V_o \cdot f_{s-DCM})}{(V_{in} \cdot (V_{in} - V_o))}\right]} \qquad (3)$$

$$D_{1-DCM} = \frac{\sqrt{\frac{[(2 \cdot L_o \cdot I_o \cdot V_o \cdot f_{s-DCM})]}{[(V_{in} \cdot (V_{in} - V_o))]}}}{[V_o / (V_{in} - V_o)]} \quad (4)$$

Where $D_{CCM}$ is D value in CCM, $D_{1\text{-}CCM}$ is $D_1$ value in CCM, $D_{1\text{-}DCM}$ is $D_1$ value in DCM, $D_{1\text{-}DCM}$ is $D_1$ value in DCM, and $f_{s\text{-}DCM}$ is the switching frequency in DCM.

From the previous four equations, it can be shown that the following equation is valid for CCM and DCM operations:

$$D_1 = \frac{D}{D_{CCM}} \cdot (1 - D_{CCM}) = \frac{D}{V_o / V_{in}} \cdot (1 - V_o / V_{in}) \quad (5)$$

Equation (5) shows that $D_1$ can be approximated, during both DCM and CCM, by the knowledge of the value of (1) D, which is readily available since it is generated internally by the controller (especially in digital controller), (2) $V_o$, which is readily available in the controller since it is anyway sensed for output voltage regulation, and (3) $V_{in}$. The input voltage $V_{in}$ availability has three cases: (1) If the input voltage is fixed or almost fixed (with narrow variation range like in many power converter applications), such as when the input voltage is supplied by a previous regulated power stage or voltage rail, it can be considered a known parameter and fed directly to the controller as a fixed value without sensing it, (2) For wide input voltage converter, the input voltage is usually sensed for control functions such as feed forward control and protection, and (3) $V_{in}$ can be roughly approximated using the value of D, $V_o$ and other parameters. The third option is usually not needed since in most designs the first or second options are available.

Figure 6:
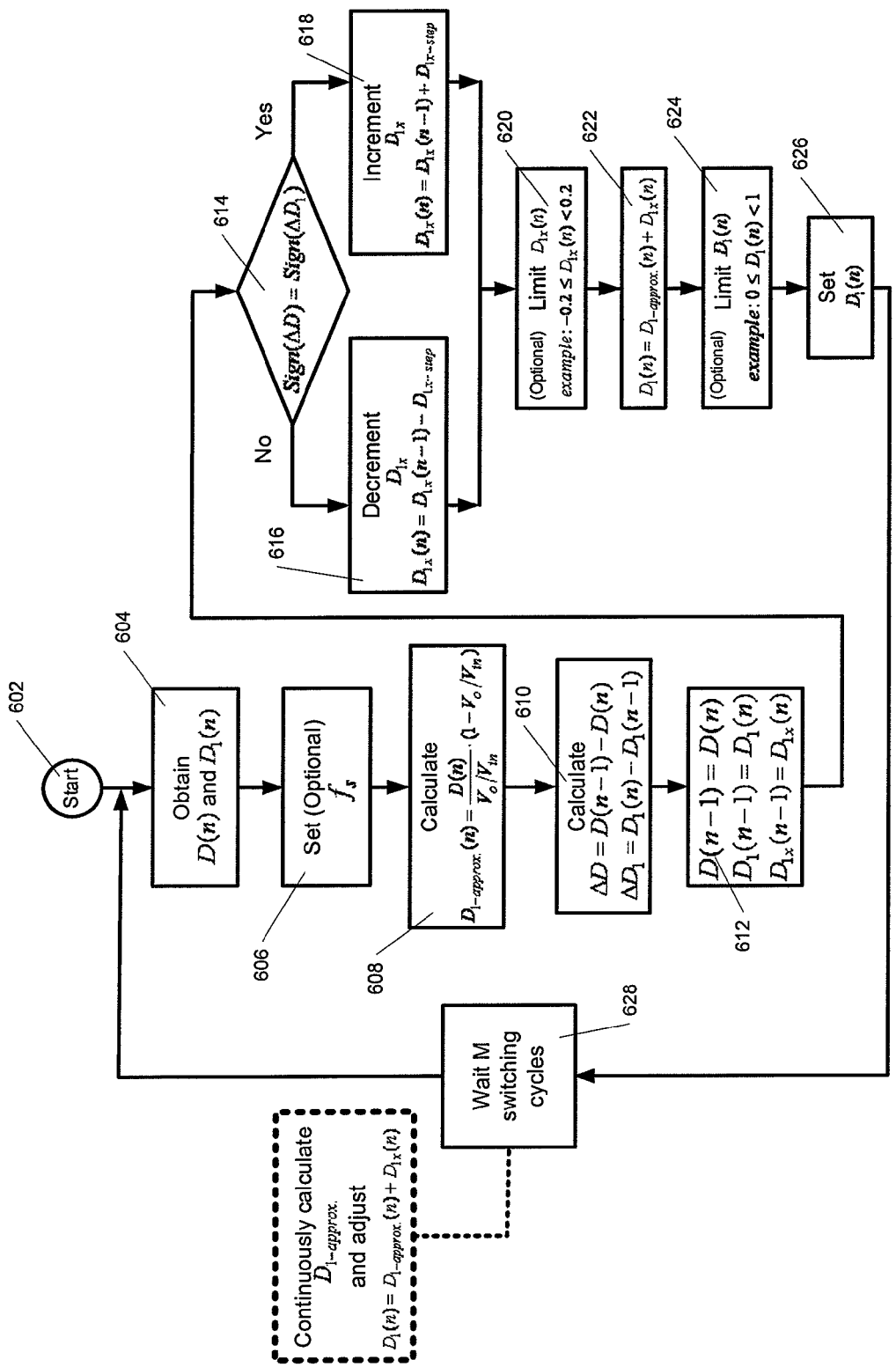
FIG. 6 shows another embodiment of an SLCD control algorithm.

Therefore, Equation (5) can be used in the controller to calculate the approximate value of $D_1$ such that the controller converges quickly to a value near the optimum value of $D_1$ and then the algorithm of FIG. 5 can be used to detect the optimum value within a few iterations. FIG. 6 shows an algorithm utilizing Equation (5) and the related discussed concept above.

DCM operation can be implemented with fixed or variable switching frequencies. In the later case, the switching frequency can be varied as a function of the load current or the duty cycle. It can be shown that the frequency can be varied as follows:

$$f_s = \frac{f_{s-CCM}}{D_{CCM}} \cdot D = \frac{f_{s-CCM}}{V_o / V_{in}} \cdot D \quad (6)$$

Equation (6) is valid in CCM and DCM. $f_{s\text{-}CCM}$ is the CCM switching frequency, which is the maximum operation switching frequency, and it is a readily available in the controller (and so D, $V_o$ and $V_{in}$ as discussed earlier). Using Equation (6), there is no need of sensing the load current in order to vary the frequency and it is one relationship valid for both operation modes.

In FIG. 6, the approximate $D_1$, $D_{1\text{-}approx.}$, is calculated using Equation (6). In order to obtain the accurate optimum value of $D_1$, its final value is perturbed around $D_{1\text{-}approx.}$ by incrementing and decrementing $D_{1x}$. When the load current changes, which results in a change in D, this can be reflected on the value of $D_{1\text{-}approx.}$, which results in quickly moving $D_1$ to a value near or very close to its optimum value. The effect of $D_{1x}$ on $D_1$ will be carried out to the new value of the load current and the algorithm adjusts $D_{1x}$ to a new value. This results in significantly improving the convergence speed to the optimum $D_1$ especially when compared to the convergence speed of the basic algorithm shown in FIG. 5. Using the algorithm of FIG. 6, the convergence to the optimum value can usually be achieved within few algorithm iterations (number of iterations will be mainly based on the perturbation step size and the magnitude of the load current change) when the load changes. The algorithm of FIG. 6 can also result in moving near $D_1$ optimum value almost instantly (once D is adjusted by the voltage regulation closed loop) if the load or other variables change.

Even though it is expected that $D_{1x}$ will naturally vary within limited range close to $D_{1\text{-}approx.}$, a safety limit can be set on the range of $D_{1x}$ as shown in FIG. 6. Similar limit can be set also on $D_1$ value.

As shown in FIG. 6, the value n represents the iteration of the algorithm. For instance, in the first iteration the value of n will be 1, in the second iteration the value of n will be 2, etc. The algorithm begins at step 602. At step 604, values (for this iteration of the algorithm) are obtained for D and $D_1$. At step 606, an (optional) value for switching frequency ($f_s$) of the power convertor is set. At step 608, a value for $D_{1\text{-}approx}$ for the current iteration is determined. At step 610, the current iteration values for D and $D_1$ are compared to values of D and $D_1$ obtained during the previous iteration and a change (Δ) is calculated for each of D and $D_1$. At step 612, the value for D(n−1) is set to the current iteration value of D, the value of $D_1$(n−1) is set to the current iteration value of $D_1$, and the Value of $D_{1x}$(n−1) is set to the current iteration value of $D_{1x}$. At step 614, the sign (+/−) of ΔD is compared to that of Δ$D_1$. If the signs are different, then at step 616 $D_{1x}$ is decremented. If the signs are the same, then at step 618 $D_{1x}$ is incremented. At (optional) step 620, a limit is set on the current iteration value of $D_{1x}$. At step 622, the current value of $D_1$ is set to $D_{1\text{-}approx}$+$D_{1x}$. At (optional) step 624, a limit is set on the current iteration value of $D_1$. At step 626, the value of $D_1$ is set. At (optional) step 628, the algorithm may delay M switching cycles before beginning the next iteration.

In one aspect, the algorithms shown and described in relation to FIGS. 5 and 6 can be coded into computer-executable code sections that can be stored on a computer-readable medium such as memory and can be retrieved and executed by a processor. In one aspect, the processor and computer-readable medium comprise a control module for controlling the operation of a power convertor. In one aspect, the control module further comprises one or more sensors that can include voltage sensors configured to sense, for example, voltage values such as $V_0$ or $V_{in}$ and the polarity of various voltage measurements. In one aspect, the control module comprises controllers that can be used to control switching frequencies

REFERENCES

[1] B. Arbetter and D. Maksimovic, "Control Method for Low-Voltage DC Power Supply In Battary-Powered Systems with Power Management," 28th Annual IEEE Power Electronics Specialists Conference, PESC'97 Record., Volume 2, 22-27 June 1997 Page(s): 1198-1204 vol. 2, 1997.

[2] X. Xhou, M. Donati, L. Amoroso, and F. Lee, "Improved Light-Load Efficiency for Synchromous Rectifier Voltage Regulator Module," IEEE Transactions on Power Electronics, Volume 15, No. 3, Page(s): 826-834, September 2000.

[3] M. Gildersleeve, H. Forghani-zadeh, and G. Rincon-Mora, "A Comprehensive Power Analysis and a highly efficient Mode-Hopping DC-DC Converter," IEEE Proceedings of Asia-Pacific Conference on ASIC, Page(s): 153-156, August 2002.

[4] Jaber Abu-Qahouq, Osama Abdel-Rahman, Lilly Huang and Issa Batarseh, "On Load Adaptive Control of Voltage Regulators for Power Managed Loads: Control Schemes to Improve Converter Efficiency and Performance," IEEE Transactions on Power Electronics, Vol. 22, No. 5, September 2007.

[5] Texas Instruments, "Synchronous-Buck MOSFET Drivers With Dead-Time Control," Tech. Rep. TPS2835 IC, 2005.

[6] V. Yousefzadeh and D. Maksimovic, "Sensorless optimization of dead times in DC-DC converters with synchronous rectifiers," IEEE Transactions on Power Electronics, Vol. 21, Issue 4, pages: 994-1002, July 2006.

[7] J. Abu-Qahouq, H. Mao, H. Al-Atrash, and I. Batarseh, "Maximum Efficiency Point Tracking (MEPT) Method and Dead Time Control," IEEE Transactions on Power Electronics, Vol. 21, Issue 5, pages: 1273-1281, September 2006.

[8] G. Schrom, P. Hazucha, et. al., "A 100 MHz Eight-Phase Buck Converter Delivering 12β in 25 mm2 Using Air-Core Inductors," IEEE Applied Power Electronics Conference and Exhibition, APEC'2007, Page(s): 286-603, February 2007.

[9] P. Hazucha, G. Schrom, et. al., "A 233-MHz 80%-87% efficient four-phase DC-DC converter utilizing air-core inductors on package," IEEE Journal of Solid-State Circuits, vol. 40, issue 4, Page(s): 838-845, April 2005.

[10] X. Zhou, T. Wang, and F. Lee, "Optimizing design for low-voltage DC-DC Converters," Twelfth Annual Applied Power Electronics Conference and Exposition, APEC '97 Conference Proceedings, Volume 2, 23-27 Feb. 1997 Page(s): 612-616 vol. 2, 1997.

[11] Xunwei Zhou; Donati, M.; Amoroso, L.; Lee, F. C.; "Improve light load efficiency for synchronous rectifier buck converter," Applied Power Electronics Conference and Exposition, 1999. APEC '99. Fourteenth Annual Volume 1, 14-18 March 1999 Page(s): 295-302 vol. 1.

[12] Mulligan, M. D.; Broach, B.; Lee, T. H.; "A constant-frequency method for improving light-load efficiency in synchronous buck converters," IEEE Power Electronics Letters, Volume 3, Issue 1, March 2005 Page(s): 24-29.

[13] Jaber Abu-Qahouq and Lilly Huang, "Highly Efficient VRM For Wide Load Range with Dynamic Non-Uniform Current Sharing," IEEE Applied Power Electronics Conference and Exhibition, APEC'2007, February 2007.

CONCLUSION

Described herein are embodiments of systems and methods of a sensor-less controller that is able to detect the inductor current zero crossing in a power converter and operate in DCM and CCM without the need to sense the inductor current. While the method is discussed using a conventional single phase buck power converter example, it has potentially more advantages for ultra high switching power converters since otherwise sensing circuitries with high speed/bandwidth and low noise capability would be needed. Since the presented controller does not need the current to be sensed, the effects of current sensing inaccuracies are eliminated. These sensing inaccuracies may be larger issue for highly integrated and on-chip integrated power converters. Moreover, while there is possible noise issues near the inductor current zero crossing points that may cause oscillations (ringing) and multiples switching, this is not an issue for embodiments of the proposed controller. Moreover, in the embodiments of the presented controller, the power consumed by the current sensing and the associated circuitry is reduced, especially for converters with paralleled modules where the current in each module needs to be sensed. The presented controller calculations and digital controller implementation are relatively simple. It requires a non-significant addition to a conventional digital controller.

While the embodiments of the presented controller are able to approach the near to optimum synchronous switch ON-time almost instantaneously based on a simple derived equation, it may require few switching cycles to lock in the exact ON-time value because of its architecture and algorithm nature. The advantages are still significant based on the above discussion especially for ultra high switching frequency and integrated power converters. At any case, sensing the zero crossing point by inductor current sensing is not necessarily always accurate and its accuracy are affected by sensing accuracy and noise.

Even though the controller architecture, algorithm and equations are described herein for a non-isolated buck power converter, they can be easily extended and applied to many other power converters based on the same concepts including DC-DC converters such as buck, boost and buck-boost converters as well as to AC-DC and DC-AC converters.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim or inventive concept does not actually recite an order to be followed by its steps or it is not otherwise specifically stated in the claims or inventive concepts or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

Many modifications and other embodiments set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims or inventive concepts. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims or inventive concepts. In this regard, for example, different combinations of elements and/or functions than those explicitly described above are also contemplated as may be set forth in some of the appended claims or inventive concepts. Although specific terms are employed herein, they are used in a generic and descriptive sense only and not for purposes of limitation.

What is claimed is:

1. A method of sensor-less operation and detection of continuous conduction mode (CCM) and discontinuous conduction mode (DCM) in a switching power converter comprising:
   determining a duty-cycle (D) of a control switch ($S_u$) of a switching power convertor;
   determining a duty-cycle width ratio ($D_1$) of a synchronous rectifier switch ($S_1$) of the switching power convertor; and
   controlling the switching power convertor such that duty-cycle width ratio ($D_1$) duty-cycle width ratio ($D_1$) is a function of the minimization of duty-cycle (D) such that an optimum duty-cycle width ratio ($D_1$) can be detected for CCM and DCM operation of the switching power convertor which allows detection by a sensor-less CCM-DCM (SLCD) power controller of a zero crossing time instant of a current through an inductor of the switching power convertor without sensing the current through the inductor, wherein controlling the power convertor such that duty-cycle width ratio ($D_1$) is a function of the minimization of duty-cycle (D) such that an optimum duty-cycle width ratio ($D_1$) can be detected for CCM and DCM operation of the switching power convertor comprises controlling the switching power convertor such that $D_1 = D/D_{CCM} \cdot (1-D_{CCM}) = D/V_o - V_{in} \cdot (1-V_o/V_{in})$, where $D_{CCM}$ is a value of duty-cycle (D) in CCM, $V_o$ is an output voltage value of the power convertor, and $V_{in}$ is an input voltage of the power convertor.

2. The method of claim 1, wherein the minimization of duty-cycle (D) comprises an iterative function with duty-cycle width ratio ($D_1$) being incremented or decremented based on a difference in sign between changes in duty-cycle (D) and duty cycle width ratio ($D_1$) such that a value of duty-cycle (D) moves toward its minimum possible value for a specific power stage.

3. The method of claim 2, wherein the specific power stage is a buck converter power stage.

4. The method of claim 2, wherein the iterative function is delayed by a number of switching cycles in order to make sure any disturbance caused by adjusting duty-cycle width ratio ($D_1$) is settled.

5. The method of claim 4, wherein the number of switching cycles is four.

6. The method of claim 1, wherein the switching power convertor has a switching frequency ($f_s$).

7. The method of claim 6, wherein the switching frequency ($f_s$) can be varied by the control module as a function of the duty-cycle (D) such that $$f_s = \frac{f_{s-CCM}}{D_{CCM}} \cdot D = \frac{f_{s-CCM}}{V_o/V_{in}} \cdot D,$$

where $f_{s-CCM}$ is a CCM switching frequency, which is a maximum operation switching frequency of the power convertor, $V_o$ is an output voltage value of the power convertor, and $V_{in}$ is an input voltage of the power convertor.

8. A sensor-less continuous conduction mode (CCM) and discontinuous conduction mode (DCM) (SLCD) power controller comprised of:
   a power converter comprised of:
      a control switch ($S_u$), wherein $S_u$ has a duty-cycle (D);
      a synchronous rectifier switch ($S_1$), wherein $S_1$ has a duty-cycle width ratio ($D_1$); and
      an inductor; and
   a control module, wherein the control module controls the power convertor such that duty-cycle width ratio ($D_1$) is a function of the minimization of duty-cycle (D) such that an optimum duty-cycle width ratio ($D_1$) can be detected for CCM and DCM operation of the power convertor which allows detection by the SLCD power controller of a zero crossing time instant of a current through the inductor without sensing the current through the inductor, wherein the minimization of duty-cycle (D) by the control module comprises an iterative function with duty-cycle width ratio ($D_1$) being incremented or decremented based on a difference in sign between changes in duty-cycle (D) and duty cycle width ratio ($D_1$) such that duty-cycle (D) moves toward its minimum possible value for a specific power stage, and wherein the iterative function is delayed by a number of switching cycles in order to make sure any disturbance caused by adjusting duty-cycle width ratio ($D_1$) is settled and the control module controls the power convertor such that $D_1 = D/D_{CCM} \cdot (1-D_{CCM}) = D/V_o - V_{in} \cdot (1-V_o/V_{in})$, where $D_{CCM}$ is a CCM value of duty-cycle (D) in CCM, $V_o$ is an output voltage value of the power convertor, and $V_{in}$ is an input voltage of the power convertor.

9. The SLCD power controller of claim 8, wherein the specific power stage is a buck converter power stage.

10. The SLCD power controller of claim 8, wherein the number of switching cycles is four.

11. The SLCD power controller of claim 8, wherein the power convertor has a switching frequency ($f_s$).

12. The SLCD power controller of claim 11, wherein the switching frequency ifs) can be varied by the control module as a function of the duty-cycle (D) such that $$f_s = \frac{f_{s-CCM}}{D_{CCM}} \cdot D = \frac{f_{s-CCM}}{V_o/V_{in}} \cdot D,$$

where $f_{s-CCM}$ is a CCM switching frequency, which is a maximum operation switching frequency of the power convertor, $V_o$ is an output voltage value of the power convertor, and $V_{in}$ is an input voltage of the power convertor.

* * * * *